United States Patent
Wang et al.

(10) Patent No.: US 9,778,795 B2
(45) Date of Patent: Oct. 3, 2017

(54) TOUCH APPARATUS

(71) Applicant: UNIDISPLAY INC., Hsinchu County (TW)

(72) Inventors: Wei-Chieh Wang, Yunlin County (TW); Meng-Chia Chan, Taichung (TW)

(73) Assignee: UNIDISPLAY INC., Hsinchu (TW)

(*) Notice: Subject to any disclaimer, the term of this patent is extended or adjusted under 35 U.S.C. 154(b) by 4 days.

(21) Appl. No.: 14/958,853

(22) Filed: Dec. 3, 2015

(65) Prior Publication Data
US 2017/0031528 A1    Feb. 2, 2017

(30) Foreign Application Priority Data

Jul. 31, 2015  (TW) .............. 104125006 A

(51) Int. Cl.
| | |
|---|---|
| *G06F 3/042* | (2006.01) |
| *G02F 1/153* | (2006.01) |
| *G06F 3/041* | (2006.01) |
| *G02F 1/1333* | (2006.01) |
| *G02F 1/155* | (2006.01) |
| *G06F 3/044* | (2006.01) |
| *G06F 3/047* | (2006.01) |

(52) U.S. Cl.
CPC .......... *G06F 3/0421* (2013.01); *G02F 1/1533* (2013.01); *G06F 3/0412* (2013.01); *G02F 1/13338* (2013.01); *G02F 1/155* (2013.01); *G02F 2201/124* (2013.01); *G06F 3/044* (2013.01); *G06F 3/047* (2013.01)

(58) Field of Classification Search
CPC ...... G06F 3/0421; G06F 3/0412; G06F 3/044; G02F 1/1533; G02F 1/13338; G02F 1/155; G02F 2201/124
See application file for complete search history.

(56) References Cited

U.S. PATENT DOCUMENTS

| | | | |
|---|---|---|---|
| 2007/0085838 A1 | 4/2007 | Ricks et al. | |
| 2012/0112183 A1* | 5/2012 | Endo ................... | H01L 29/7869 257/43 |

(Continued)

FOREIGN PATENT DOCUMENTS

| | | |
|---|---|---|
| TW | 200846803 | 12/2008 |
| TW | 201222117 | 6/2012 |

(Continued)

OTHER PUBLICATIONS

"Search report of Europe Counterpart Application", dated Sep. 5, 2016, p. 1-p. 10.

(Continued)

*Primary Examiner* — Charles Hicks
(74) *Attorney, Agent, or Firm* — Jianq Chyun IP Office

(57) ABSTRACT

A touch apparatus including a first substrate, a touch sensing structure, an insulation layer, a driving electrode, an electrochromic layer, a reflective electrode and a second substrate stacked sequentially along a direction is provided. The driving electrode and the reflective electrode are used to drive the electrochromic layer. The driving electrode is contacted with the insulation layer. The insulation layer has a thickness T1 in the direction. The first substrate has a thickness T2 in the direction.

$T1<(T2/10)$.

7 Claims, 2 Drawing Sheets

(56) References Cited

U.S. PATENT DOCUMENTS

| | | |
|---|---|---|
| 2013/0170013 A1* | 7/2013 | Tonar .................... B60R 1/088 359/296 |
| 2014/0085700 A1 | 3/2014 | Park |
| 2014/0118642 A1 | 5/2014 | Wang et al. |
| 2015/0021584 A1 | 1/2015 | Guard et al. |
| 2015/0022739 A1 | 1/2015 | Chen et al. |

FOREIGN PATENT DOCUMENTS

| | | |
|---|---|---|
| TW | M491202 | 12/2014 |
| TW | M504528 | 7/2015 |

OTHER PUBLICATIONS

"Office Action of Taiwan Counterpart Application", dated May 19, 2016, p. 1-p. 5.

\* cited by examiner

TOUCH APPARATUS

CROSS-REFERENCE TO RELATED APPLICATION

This application claims the priority benefit of Taiwan application serial no. 104125006, filed on Jul. 13, 2015. The entirety of the above-mentioned patent application is hereby incorporated by reference herein and made a part of this specification.

BACKGROUND OF THE INVENTION

1. Field of the Invention

The invention relates to an electronic device, and relates particularly to a touch apparatus.

2. Description of Related Art

Electrochromism refers to the optical properties (for example: transmittance, reflectance or absorbance) of an electrochromism layer which is able to stably produce a reversible change in the visible light wavelength ranges, such that a change in color and transparency may be displayed under the effect of an applied voltage or current. Electrochromism technology can be adapted for a variety of applications, for example, it may be adapted for energy saving windows, rear-view mirrors of automobiles, display devices and the like.

Taking a rear-view mirror of an automobile, for example, in order for the rear-view mirror of the automobile to have diverse functions, a touch sensing structure is disposed in front of an electrochromism reflective mirror, such that in addition to using the electrochromism reflective mirror to view rear images, a user may further control the electrochromism reflective mirror through the touch sensing structure. In conventional techniques, the touch sensing structure is first formed on a carrier board so as to form an externally mountable touch panel; then the externally mountable touch panel is stuck on the surface of the electrochromism reflective mirror so as form the electrochromism reflective mirror with a touch function. Although this allows the electrochromism reflective mirror to have the touch function, however, it makes the thickness of the electrochromism reflective mirror too thick, and is not suited for the aesthetics of the external appearance of the electrochromism reflective mirror.

SUMMARY OF THE INVENTION

The invention provides a touch apparatus which combines a touch function and a thin external appearance.

A touch apparatus of the invention includes a first substrate, a touch sensing structure, an insulation layer, a driving electrode, an electrochromic layer, a reflective electrode and a second substrate which are stacked sequentially along a direction. The driving electrode and the reflective electrode are used to drive the electrochromic layer. The driving electrode is contacted with the insulation layer. The insulation layer has a thickness T1 in the direction. The first substrate has a thickness T2 in the direction.

$T1 < (T2/10)$.

In an embodiment of the invention, $T1 \leq 100$ micrometers (μm).

In an embodiment of the invention, the touch sensing structure includes a plurality of first sensing patterns and a plurality of second sensing patterns. The first sensing patterns and the second sensing patterns are alternatingly arranged and belong to the same film layer.

In an embodiment of the invention, the touch sensing structure includes a plurality of first sensing series, an insulation layer and a plurality of second sensing series. The insulation layer is disposed on the first sensing series. The plurality of second sensing series cover the insulation layer, and are interlaced and electrically isolated with the first sensing series.

In an embodiment of the invention, the driving electrode is a transparent electrode and covers the electrochromic layer entirely.

In an embodiment of the invention, the reflective electrode totally reflect and covers the electrochromic layer entirely.

In an embodiment of the invention, when the electrochromic layer is enabled, the electrochromic layer is rendered a diming state, and when the electrochromic layer is not enabled, the electrochromic layer is rendered a light transmissive state.

Based on the above, the first substrate, the driving electrode, the electrochromic layer, the reflective electrode, and the second substrate may be viewed as a switchable mirror device. In an embodiment of the touch apparatus of the invention, the touch sensing structure is disposed inside of the switchable mirror device, so as to combine the touch function and the thin external appearance.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
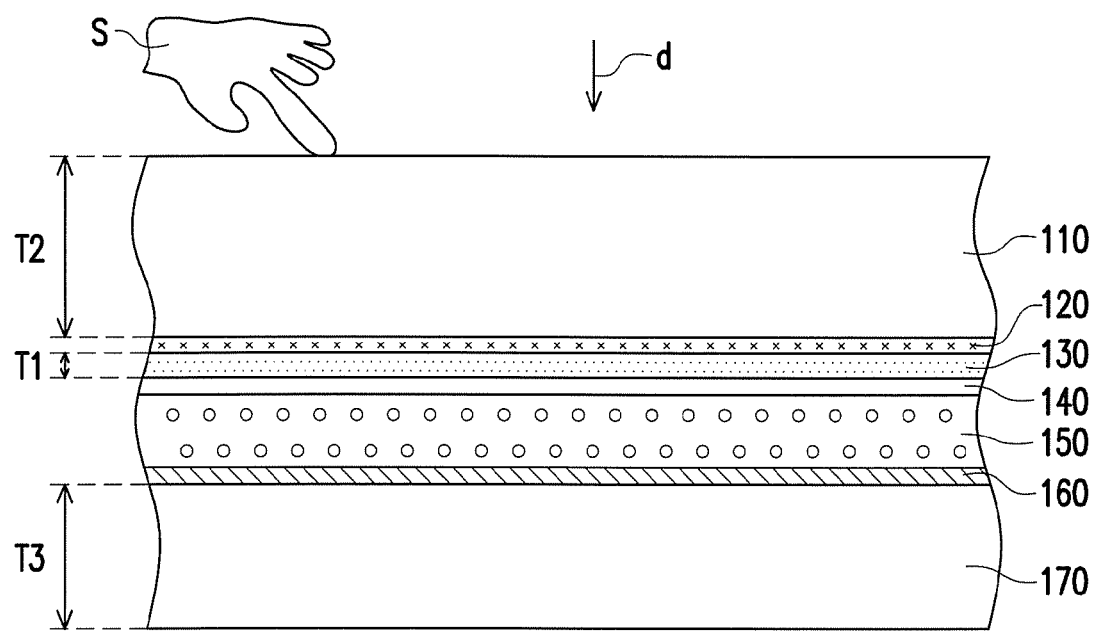
FIG. 1 is a cross-sectional schematic diagram of a touch apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a cross-sectional schematic diagram of a touch apparatus according to an embodiment of the invention. Referring to FIG. 1, a touch apparatus 100 includes a first substrate 110, a touch sensing structure 120, an insulation layer 130, a driving electrode 140, an electrochromic layer 150, a reflective electrode 160 and a second substrate 170 stacked sequentially along a direction d. In the present embodiment, the first substrate 110 may be a light transmissive substrate and the second substrate 170 may be a light transmissive or reflective substrate. A material of the light transmissive substrate may be glass, quartz, an organic polymer or other suitable material.

Figure 2:
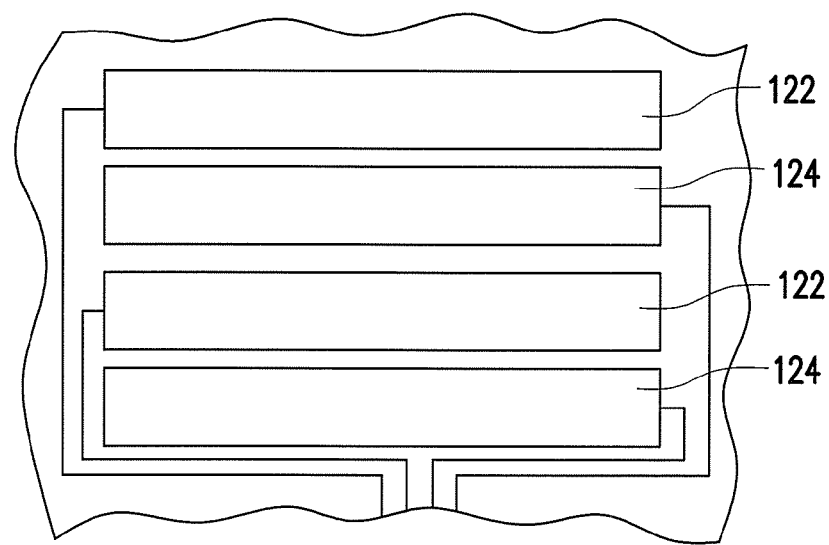
FIG. 2 is a top schematic view of a touch sensing structure according to an embodiment of the invention.

Referring to FIG. 1, the touch sensing structure 120 is disposed between the first substrate 110 and the insulation layer 130. FIG. 2 is a top schematic view of a touch sensing structure according to an embodiment of the invention. Referring to FIG. 2, the touch sensing structure 120 includes a plurality of first sensing patterns 122 and a plurality of second sensing patterns 124. Either one of the first sensing patterns 122 or the second sensing patterns 124 may act as a transmission (Tx) electrode and the other one of the first sensing patterns 122 or the second sensing patterns 124 may act as a reception (Rx) electrode. In the present embodiment, the first sensing patterns 122 and the second sensing patterns 124 may be alternatingly arranged as an option, and belong to the same film layer. However, the touch sensing structure of the invention is not limited to the touch sensing structure 120 mentioned above, and in other embodiments the touch sensing structure 120 may be rendered in other suitable configurations, an example of which is described using FIG. 3 below.

Figure 3:
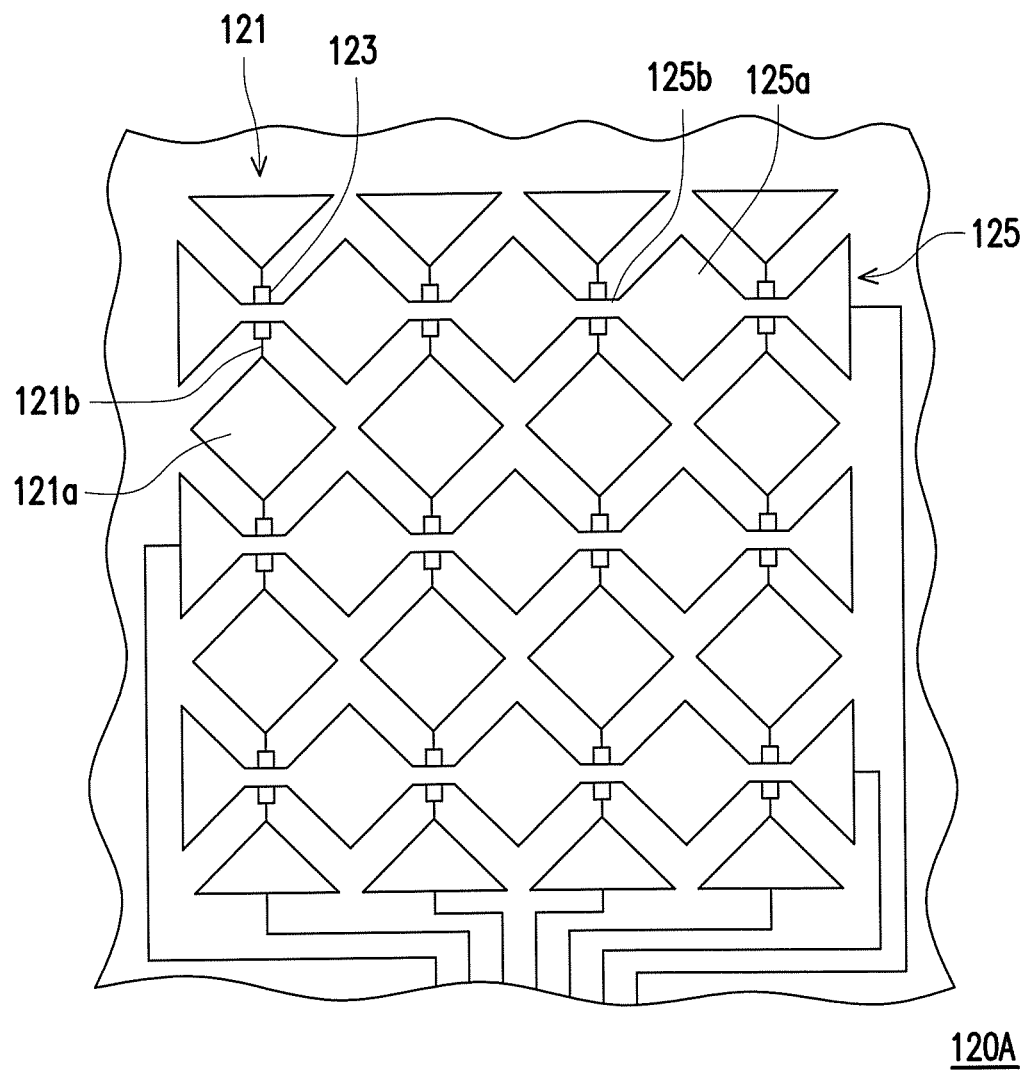
FIG. 3 is a top schematic view of a touch sensing structure according to another embodiment of the invention.

FIG. 3 is a top schematic view of a touch sensing structure according to another embodiment of the invention. Referring to FIG. 3, a touch sensing structure 120A of FIG. 3 may be used to replace the touch sensing structure 120 of FIG. 1. In the embodiment of FIG. 3, the touch sensing structure 120A may include a plurality of first sensing series 121, an insulating pattern 123 disposed on the first sensing series 121 and a plurality of second sensing series 125 covering the insulating pattern 123. The second sensing series 125 are interlaced with the first sensing series 121, and are electrically isolated with the first sensing series 121 by the insulating pattern 123. Each of the first sensing series 121 may include a plurality of sensing pads 121a and a plurality of bridge connectors 121b, wherein each of the bridge connectors 121b is electrically connected to two adjacent sensing pads 121a. Each of the second sensing series 125 may include a plurality of sensing pads 125a and a plurality of bridge connectors 125b, wherein each of the bridge connectors 125b is electrically connected to two adjacent sensing pads 125a. In the embodiment of FIG. 3, the bridge connectors 121b of the first sensing series 121 may be formed first; then, the insulating pattern 123 is formed on the bridge connectors 121b; next, the sensing pads 121a of the first sensing series 121, the sensing pads 125a of the second sensing series 125 and the bridge connectors 125b of the second sensing series 125 are formed at the same time. The bridge connectors 125b of the second sensing series 125 cross over the insulating pattern 123, such that the second sensing series 125 and the first sensing series 121 are electrically isolated.

It should be noted, the touch sensing structure 120, 120A shown in FIG. 2 and FIG. 3 are examples used for describing the touch sensing structure of the invention and the invention should not be limited thereto. Regardless of the configuration, a touch sensing structure which may be used to detect a touch action of a user S such that the touch apparatus 100 may determine a touch location of the user S, are all touch sensing structures within the range desired to be protected by the invention Referring to FIG. 1, the insulation layer 130 is disposed between the touch sensing structure 120 and the driving electrode 140. The touch sensing structure 120 is electrically isolated with the driving electrode 140 by the insulation layer 130. The insulation layer 130 is contacted directly with the driving electrode 140. The insulation layer 130 is light transmissive. The insulation layer 130 has a thickness T1 in the direction d, the first substrate 110 has a thickness T2 in the direction d, and T1<(T2/10). The second substrate 170 has a thickness T3 in the direction d. In other words, the insulation layer 130 is a single film layer formed by using a semiconductor manufacturing process, and the thickness T1 of the insulation layer 130 is far smaller than the thicknesses T2, T3 of the first and second substrates 110, 170. For example, the thicknesses T2, T3 of the first and second substrates 110, 170 may be between 100 micrometers (μm) to 500 micrometers (μm), and the thickness T1 of the insulation layer 130 may be between 10 micrometers (μm) to 50 micrometers (μm), however the invention is not limited thereto, and in other embodiments, the thicknesses T1, T2, T3 may be other suitable sizes. A material of the insulation layer 130 may be an inorganic material (for example: silicon oxide, silicon nitride, silicon oxynitride and such) or an organic material, however it should not be construed as a limitation to the invention.

The driving electrode 140 is disposed between the insulation layer 130 and the electrochromic layer. The driving electrode 140 is a transparent electrode. In the present embodiment, the driving electrode 140 may be rendered on the whole surface and cover the electrochromic layer 150 entirely as an option. However, the invention is not limited thereto, and in other embodiments, the driving electrode 140 may also be designed as other suitable patterns in view of actual requirements. A material of the driving electrode 140, for example, is indium tin oxide, indium zinc oxide, aluminum tin oxide, aluminum zinc oxide, indium germanium zinc oxide, or other suitable oxide, or a stacked layer of at least to of the aforementioned. However, the invention is not limited thereto, and in other embodiments, the driving electrode 140 may also be other suitable material.

The electrochromic layer 150 is disposed between the driving electrode 140 and the reflective electrode 160. The electrochromic layer 150 may be an inorganic material, an organic material or a combination thereof. The inorganic material may be a metal oxide or a covalent bond metal complex, wherein the metal oxide, for example, is a transition metal oxide (for example: $WO_3$, $MoO_3$, $V_2O_5$, $Nb_2O_5$, NiO, SnO, $Fe_2O_3$, CoO, $Ir_2O_3$, $Rh_2O_3$ or $MnO_2$), and the covalent bond metal complex, for example, is Prussian blue, however it should not be construed as a limitation to the invention. The organic material is, for example, aniline, a dioxythiophen (EDOT) monomer, or a high polymer formed from a polymerized viologen monomer, however the invention is not limited thereto.

The reflective electrode 160 is disposed between the electrochromic layer 150 and the second substrate 170. In the present embodiment, the reflective electrode 160 may totally reflect and cover the electrochromic layer 150 entirely as an option. However, the invention is not limited thereto, and in other embodiments, the reflective electrode 160 may also be other suitable designs in view of actual requirements. A material selected for the reflective electrode 160 is preferably a conductive material with high reflectance, for example: silver (Ag), however the invention is not limited thereto, and in other embodiments, other suitable material may be selected for the reflective electrode 160.

The reflective electrode 160 and the driving electrode 140 are used to drive the electrochromic layer 150. In other words, when the electrochromic layer 150 is enabled (for example: when there is a sufficient potential difference between the reflective electrode 160 and the driving electrode 140), an electrochemical oxidation reduction reaction occurs in the electrochromic layer 150 changing an energy level thereof, so as to render a diming state. At this time, when an outside light beam penetrates through the first substrate 110, the touch sensing structure 120, the insulation layer 130, the driving electrode 140 sequentially so as to reach the electrochromic layer 150, the outside light beam will be absorbed by the electrochromic layer 150, such that the touch apparatus (for example: a rear-view mirror of a transportation tool) switches to an anti-glare mode. On the other hand, when the electrochromic layer 150 is not enabled (for example: when there is not a sufficient potential difference between the reflective electrode 160 and the driving electrode 140), the electrochromic layer 150 will be rendered a light transmissive state, at which time the outside light beam may penetrate through the first substrate 110, the touch sensing structure 120, the insulation layer 130, the driving electrode 140 and the electrochromic layer 150 and is reflected by the reflective electrode 160, such that the touch apparatus 100 (for example: a rear-view mirror of a transportation tool) switches to a mirror mode.

In summary, the first substrate, the driving electrode, the electrochromic layer, the reflective electrode, and the second substrate may be viewed as a switchable mirror device. In an embodiment of the invention, the touch apparatus disposes the touch sensing structure inside of the switchable mirror device, so as to combine the touch function and the thin external appearance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch apparatus, comprising:
    a first substrate;
    a touch sensing structure;
    an insulation layer;
    a driving electrode;
    an electrochromic layer;
    a reflective electrode; and
    a second substrate, wherein the first substrate, the touch sensing structure, the insulation layer, the driving electrode, the electrochromic layer, the reflective electrode and the second substrate are stacked sequentially along a direction; the driving electrode and the reflective electrode are used to drive the electrochromic layer; the driving electrode is contacted with the insulation layer; the insulation layer has a thickness T1 in the direction; the first substrate has a thickness T2 in the direction; and T1<(T2/10).

2. The touch apparatus as claimed in claim 1, wherein T1≤100 micrometers.

3. The touch apparatus as claimed in claim 1, wherein the touch sensing structure comprises:
    a plurality of first sensing patterns; and
    a plurality of second sensing patterns, the first sensing patterns and the second sensing patterns are alternatingly arranged and belong to the same film layer.

4. The touch apparatus as claimed in claim 1, wherein the touch sensing structure comprises:
    a plurality of first sensing patterns;
    an insulation layer, disposed on the first sensing patterns; and
    a plurality of second sensing patterns, covering the insulation layer, and interlaced and electrically isolated with the first sensing patterns.

5. The touch apparatus as claimed in claim 1, wherein the driving electrode is a transparent electrode and covers the electrochromic layer entirely.

6. The touch apparatus as claimed in claim 1, wherein the reflective electrode totally reflects and covers the electrochromic layer entirely.

7. The touch apparatus as claimed in claim 1, wherein when the electrochromic layer is enabled, the electrochromic layer is rendered a diming state; and
    when the electrochromic layer is not enabled, the electrochromic layer is rendered a light transmissive state.

* * * * *